(12) United States Patent
Ahmed et al.

(10) Patent No.: US 9,621,619 B2
(45) Date of Patent: Apr. 11, 2017

(54) ENHANCED NOTIFICATION FOR RELEVANT COMMUNICATIONS

(71) Applicant: International Business Machines Corporation, Armonk, NY (US)

(72) Inventors: Maryam Ahmed, Vaughan (CA); Al Chakra, Apex, NC (US); Michael S. Thomason, Raleigh, NC (US); Tong Yu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 13/772,399

(22) Filed: Feb. 21, 2013

(65) Prior Publication Data

US 2014/0237042 A1    Aug. 21, 2014

(51) Int. Cl.
*G06F 15/16* (2006.01)
*H04L 29/08* (2006.01)
*H04L 12/58* (2006.01)

(52) U.S. Cl.
CPC .............. *H04L 67/02* (2013.01); *H04L 51/24* (2013.01); *H04L 51/32* (2013.01); *H04L 67/24* (2013.01); *H04L 67/26* (2013.01); *H04L 67/36* (2013.01)

(58) Field of Classification Search
CPC .......................... H04L 29/08675; H04L 67/22
USPC ................................................. 709/201, 204
See application file for complete search history.

(56) References Cited

U.S. PATENT DOCUMENTS

| 6,839,417 | B2 | 1/2005 | Weisman et al. |
|---|---|---|---|
| 7,590,539 | B1 | 9/2009 | Kirkpatrick |
| 7,743,340 | B2 | 6/2010 | Horvitz et al. |
| 2004/0098462 | A1* | 5/2004 | Horvitz ............... G05B 19/404 709/207 |
| 2004/0194110 | A1 | 9/2004 | McKee et al. |
| 2004/0194150 | A1* | 9/2004 | Banker ............... G06F 17/3089 725/135 |
| 2005/0177805 | A1* | 8/2005 | Lynch ............... G06F 17/30663 715/700 |
| 2005/0198265 | A1 | 9/2005 | Veprek et al. |
| 2007/0180036 | A1 | 8/2007 | Hebert et al. |
| 2007/0282783 | A1* | 12/2007 | Singh ............................ 707/1 |
| 2009/0276419 | A1* | 11/2009 | Jones et al. ..................... 707/5 |
| 2011/0202956 | A1* | 8/2011 | Connelly et al. ............. 725/38 |

* cited by examiner

*Primary Examiner* — Wing F Chan
*Assistant Examiner* — Andrew Woo
(74) *Attorney, Agent, or Firm* — Daniel R. Simek (57) ABSTRACT

Embodiments of the present invention disclose a method, computer program product, and system for providing a severity of a notification for a communication. A computing device determines a topic and associated information of a current activity, operating on the computing device. The computing device receives a communication and determines the topic and associated information of the communication. The computing device determines a level of relevance between the topic and associated information of the received communication and the topic and associated information of the current activity. The computing device determines whether the level of relevance exceeds a predefined threshold, and in response to determining that the level of relevance exceeds the predefined threshold, the computing device provides a notification, wherein the severity of the notification for the communication is proportional to the level of relevance.

20 Claims, 5 Drawing Sheets

ENHANCED NOTIFICATION FOR RELEVANT COMMUNICATIONS

FIELD OF THE INVENTION

The present invention relates generally to the field of communication notification, and more particularly to providing enhanced notification levels corresponding to the level of relevance of a communication to a current computing device activity.

BACKGROUND OF THE INVENTION

Current technology provides notification of email received, text message SMS, call waiting, phone mail waiting, updates to websites, blogs, and various social media sources; letting a user know that an electronic communication has been received. More recently, communications may include notifications from home appliances, security systems, automobile maintenance, entertainment devices and other electronic devices enabled with the appropriate sensor and communication configurations.

Most notifications are in the form of an audible alert, producing a recognizable tone or sequence of tones when a communication is received by a programmable electronic device. Some notifications may be in a visual format, such as a calendar or appointment alert that may pop up on a display screen with a message associated with the communication. In still other cases, a notification may combine both audio and visual alerts.

Notifications are helpful for reminding a user of important scheduled events, tasks to be completed, and awareness that forms of communication or updates to web pages, websites, or social media sites have been received or have been updated. However, notifications can cause distraction to users engaged in activities requiring high levels of focus. For users that receive update notifications from rich site summary (RSS) services of multiple websites, and who participate in many social media sites and applications, the frequency of notifications may also be extremely annoying.

Notification control typically includes all-or-nothing user decisions or requires users to input extensive profile setting details that are time consuming and provide generic control at best.

SUMMARY

Embodiments of the present invention disclose a method, computer program product, and system for providing a severity of a notification for a communication. A computing device determines a topic of a current activity and associated information of the current activity, operating on the computing device. The computing device receives a communication and determines a topic and associated information of the communication. The computing device determines a level of relevance between the topic and associated information of the received communication and the topic and associated information of the current activity. The computing device determines whether the level of relevance exceeds a predefined threshold and in response to determining that the level of relevance exceeds the predefined threshold, the computing device provides a notification, wherein the severity of the notification for the communication is proportional to the level of relevance.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention recognize that a computing device user that is focusing on a current activity would benefit from suppressing notification interruptions from communications that are not relevant to the current activity. In embodiments of the present invention, notifications from communications having a level of relevance to the current activity, that exceeds a defined threshold, are presented to a user of a computing device. The severity of notifications, audible, visual or both, are presented to reflect the level of relevance, such that the higher the level of relevance, the more severe the notification interruption. The present invention will now be described in detail with reference to the Figures.

Figure 1:
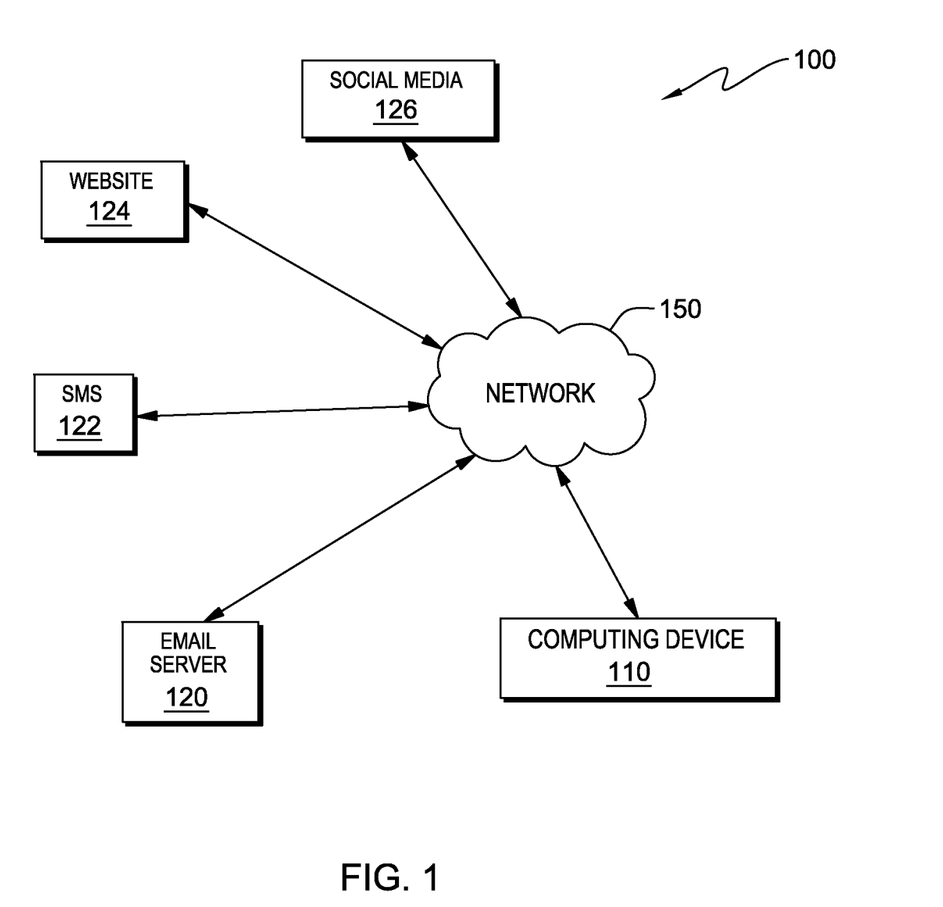
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. Distributed data processing environment 100 includes computing device 110, email server 120, short message service (SMS) 122, website 124, and social media 126, all interconnected through network 150. In one embodiment of the present invention, distributed data processing environment 100 is an environment in which various electronic communications are received by a computing device, such as computing device 110 and are analyzed to determine the subject or topic of the communication. The topic and contents of the communications are compared to the topic and contents of the open activities on computing device 110 and a relevance score or relevance percentage of the communications to one or more open activities, is determined. If the relevance of the communication to the current activity exceeds a threshold set in a preference file, a notification is presented, which may vary in the severity of interruption based on the degree of relevance to the current activity of computing device 110.

Computing device 110 includes applications and functionality that enables the receipt of communications and information messages from various sources, such as email server 120, for example. In one embodiment, computing device 110 may receive email correspondence from email server 120, text messages from SMS 122, updates from website 124, and various communications or alerts from social media 126, all through network 150.

In various embodiments, computing device 110 may be a laptop computer, a tablet computer, a netbook personal computer (PC), a desktop computer, a personal digital assistant (PDA), a smart phone, a mainframe computer, or a networked server computer. Computing device 110 receives and responds to communications that include, but are not limited to at least one or a combination of: an email server, a SMS service, a website, a social media source, and open files. In general, computing device 110 may be any programmable electronic device, configured to connect to and access various communication sources by connection to network 150, and as described in further detail with respect to FIG. 5.

Network 150 interconnects the computing devices and resources within distributed data processing environment 100, such as computing device 110. Network 150 may be, for example, a local area network (LAN), a wide area network (WAN) such as the Internet, or a combination of the two, and can include wired or wireless connections. In general, network 150 can be any combination of connections and protocols that will support communications via suitable channels between computing device 110 and email server 120, SMS 122, website 124, and social media 126, in accordance with an embodiment of the present invention.

Email server 120 is a server connected to network 150 and configured to provide email services to authorized computing devices, such as computing device 110. Email server 120 receives email communications from computing device 110 and sends email communications to computing device 110 that originate from other computing devices connected to network 150. Emails received by computing device 110 are displayed when a local email application is initiated on computing device 110. Email communications sent by email server 120 typically include identification of the sender, a subject line, date and time of sending the communication, and contents in the body of the communication, which may include, but are not limited to; text, images, attachments, and URL links.

SMS 122 is a short message service, typically supported by one or more servers connected to a network, such as network 150. SMS 122 provides text message communications using standardized communications protocols that allow the exchange of short text messages between fixed line or mobile devices. Communications from SMS 122 typically include text messages of lengths up to a specific character limit per sent message, for example, 160 characters for 7-bit messaging. SMS 122 communications to a recipient, such as computing device 110, may be "sent and stored" for retrieval by the recipient at a later time. Retrieved SMS communications are displayed and typically include information associated with the sender, the text contents of the communication, and may include the date and time the communication was sent.

Website 124 is one or more web pages with content or information that may be updated from time to time. Website 124 provides an update notification facility that sends communications to subscribers regarding additions, changes or deletions that have been made to content on one or more web pages of website 124. For example, website 124 may offer an RSS feed that sends a communication to computer device 110 indicating that updates have been made to website 124, and may include information about the updates.

Social media 126 is a web service supported by one or more servers connected to network 150. Social media 126 includes, but is not limited to: blogs, posting on face book, Twitter (Twitter, Inc.), forums, or other sources of media accessible by connection to network 150 that sends communications to subscribers. Communications from social media 126 may include, but are not limited to: author, source, title, subject, date & time of posting, photographs with captions, and content text. Computing device 110 is a member or is registered with social media 126 and receives communications regarding new content being posted, existing content being updated, or may be a response to a question or posting submitted by computing device 110.

Figure 2:
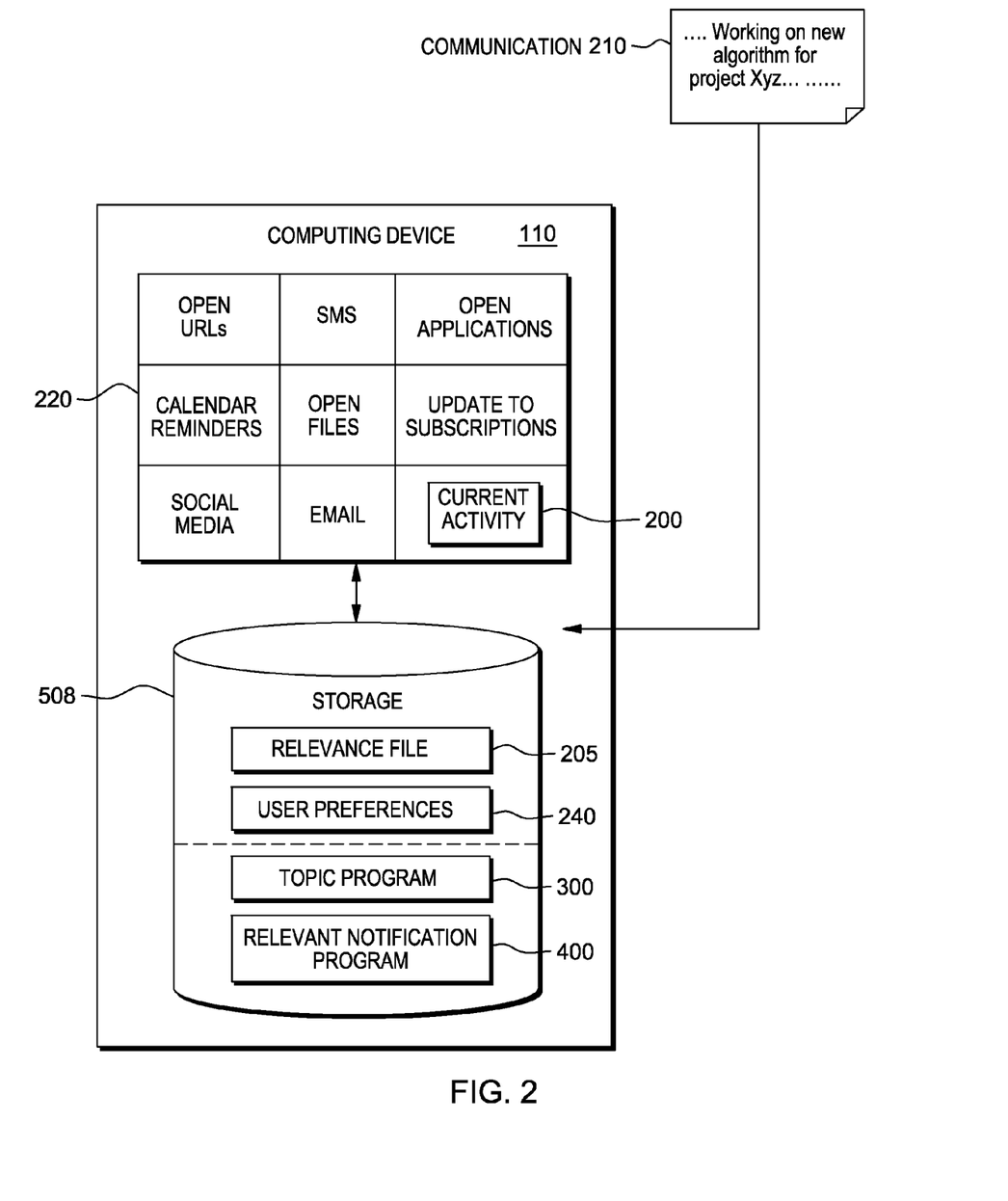
FIG. 2 is a block diagram illustrating relevant activity components of a computing device within the data processing environment of FIG. 1, in accordance with an embodiment of the present invention.

FIG. 2 depicts a block diagram illustrating relevant activity components on computing device 110, within the data processing environment of FIG. 1, in accordance with an embodiment of the present invention. Included in FIG. 2 are communication 210, and computing device 110 which further includes user activities 220, and persistent storage 508. User activities 220 illustrates exemplary activities of a user of computing device 110, including current activity 200. Activities that are indicated as being "open", i.e., open URLs, open files, and open applications, are initiated by a user of computing device 110 and the open activity that is currently active is designated as current activity 200. Open activities are left open as a user of computing device 110 initiated or switched to another activity. There are additional activities that are available to the user of computing device 110, such as email or calendar reminders, for example, but are illustrated as not currently open. Other activities, when initiated by a user of computing device 110, will become current activity 200.

Figure 5:
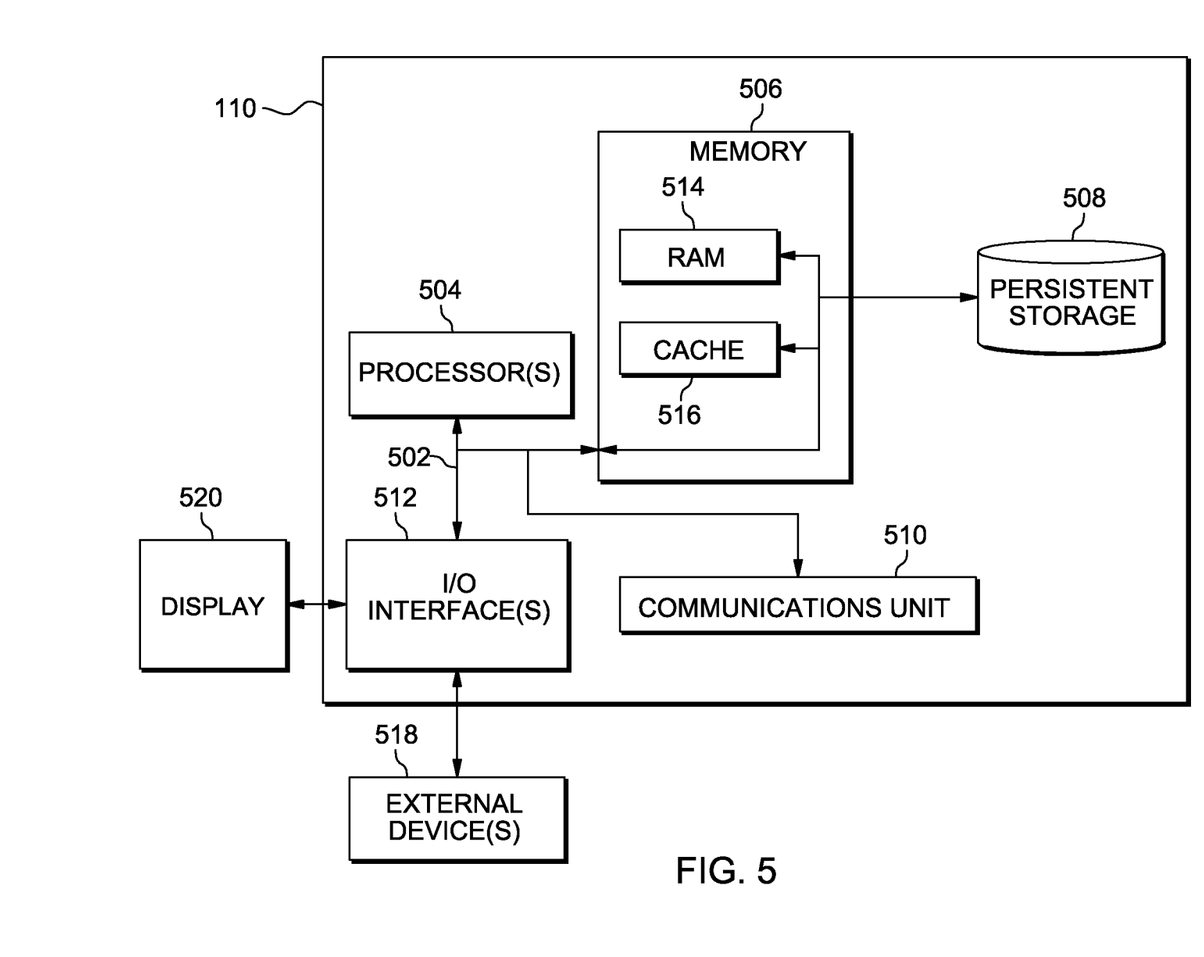
FIG. 5 depicts a block diagram of components of the computing device executing the relevant notification program, in accordance with an embodiment of the present invention.

Current activity 200 is a user activity on computing device 110 in which the screen image or "window" of current activity 200 is visibly shown on a display, such as display 520, as described in the discussion of FIG. 5, and the computer cursor is active and visible within the displayed screen. A user of computing device 110 can view and interact with current activity 200 and may be able to edit or make changes depending upon the activity. Current activity 200 may be an open application, and the open application may be used to initiate a file to be edited within the application, such as a word processing application, in which case the initiated file becomes current activity 200. When a second file within the application is initiated and becomes current activity 200, the first file may remain open, but is no longer the current activity.

Communication 210 is a communication received by computing device 110 and sent by one of the communication sources described in FIG. 1, for example email 120. Communication 210 may include, for example, an identity of its source, a subject field, contents including text, the date and time sent, and author identity. In one embodiment of the present invention, the topic information and context of communication 210 is analyzed to determine the level of relevance of communication 210 to activities of computing device 110.

Persistent storage 508 is illustrated as a component of computing device 110 and includes relevance profile 205, user preferences 240, topic program 300 and relevant notification program 400. Files and applications that constitute or support activities of computing device 110 are also stored on persistent storage 508. Persistent storage 508 is described in more detail in discussions of FIG. 5.

Relevance file 205 includes the stored topic and context information determined for communications received by computing device 110, and the topic and context information determined for open activities of computing device 110. The topic and context information of received communications are compared to the topic and context information of the open activities on computing device 110 to determine how relevant a communication is to the open activities and particularly current activity 200. If the topic of a communication has no relevance, or low relevance to current activity 200, then no notification is presented. The topic and context information of the communication is stored in relevance file 205 to be compared to another activity when current activity 200 is changed. When there is a change to current activity 200, relevance file 205 is checked to determine relevance of topic and context information to the new current activity 200.

User preferences 240 is a file accessible to topic program 300 and relevant notification program 400, that includes settings and preferences, predefined by a user of computing device 110. The settings and preferences of user preferences 240 are configurable and include, but are not limited to: a minimum relevance threshold level, zero or more intermediate relevance threshold levels, an interrupt relevance threshold level, a listing and association of known authors, sources to include or exclude, date and time information, file types, a listing of topics of interest, acknowledgement requirements of notifications, and choices of enhancement to notifications that correspond to a designated relevance threshold level.

A user of computing device 110 may establish none, one, or more intermediate threshold relevance levels by adding predefined thresholds and notification actions in user preferences 240. If one or more intermediate threshold relevance levels is established, each predefined threshold is associated with a level of relevance, for example 70%, and an enhanced notification action. Enhanced notification actions may include changing the volume of an audible notification, changing the duration, changing the tone or pitch of the notification, changing the type of audible sound notification, or changing the frequency at which the notification is presented. Enhancement to visual notifications associated with a level of relevance may include changes to the intensity, brightness, color, flashing, movement, shape, size, or positioning of the visual notification, at or near a cursor position. The notifications associated with intermediate or high threshold levels may use a combination of notification action changes.

Topic program 300 operates in the background of computing device 110 and analyzes current activity 200 to determine the topic and context information of the activity. Topic information may include but is not limited to: keywords, phrases, author ID, page or file title, subject line, filename or high frequency occurrence of keywords or combinations of keywords within the content of the activity. Topic information may be further refined by associating a version, date, or author with the activity subject matter. The context information associated with the activity may include, but is not limited to one or a combination of: the type of activity (a response, a database search, creating or updating a document), identifying a recipient, a frequently repeated task, the date, day of week, or time of day. Topic program 300 similarly determines the topic and context information for communications received by computing device 110. Topic and context information of open activities and unacknowledged communications received by computing device 110, are stored in relevance file 205.

Relevant notification program 400 also operates in the background of computing device 110 and provides filtering and enhancement of notification severity for communications that are relevant to the current activity, for example, current activity 200. Relevant notification program 400 determines the level of relevance by comparing topic and context information between current activity 200 and received communication 210.

Relevant notification program 400 filters notification interruptions to a user of computing device 110 by suppressing notifications that do not exceed a set minimum threshold level of relevance to current activity 200, on computing device 110. In addition, relevant notification program 400 includes an enhancement to the intensity or severity of a notification that is based on the level of relevance. If the relevance of the topic information of a received communication exceeds an intermediate threshold set above the minimum threshold, the severity of the notification increases. Higher levels of relevance may warrant a visual interruption within the screen display of current activity 200. Thus, the more relevant the communication is to the current activity, the more severe or intrusive the notification, including an interruption as presented to a user of computing device 110.

Figure 3:
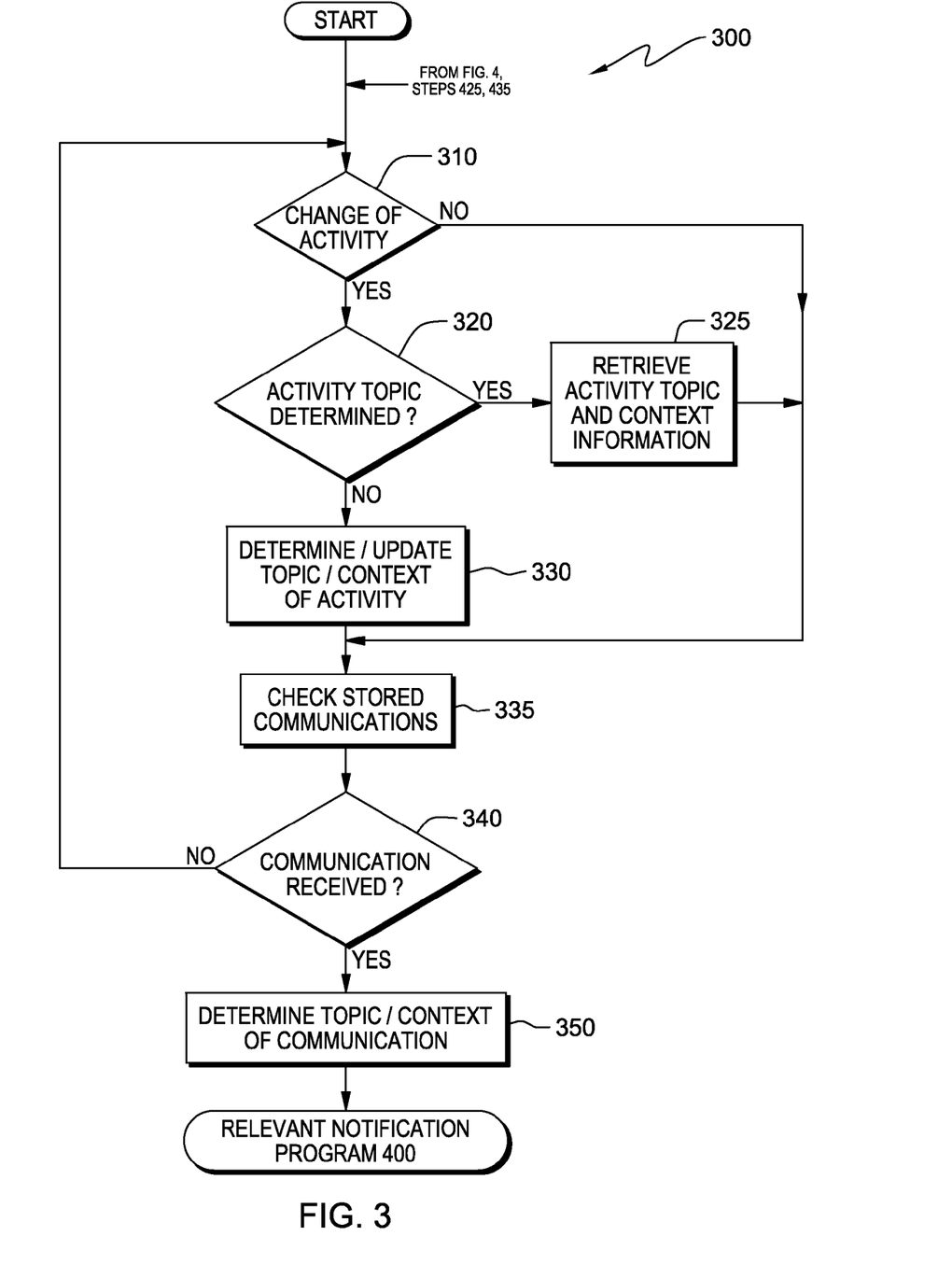
FIG. 3 is a flowchart depicting operational steps of a topic-determining program running on a computing device, within the data processing environment of FIG. 1, in accordance with an embodiment of the present invention.

FIG. 3 is a flowchart depicting operational steps of a topic program 300 running on computing device 110, within the data processing environment of FIG. 1, in accordance with an embodiment of the present invention. Topic program 300 monitors the activities of computing device 110 and determines that there is a change of the current activity (step 310, "yes" branch). For example, a user of computing device 110 may initiate an application to view a web page. Topic program 300 identifies the application when it is initiated, for example, current activity 200. The user of computing device 110 subsequently loads a specific web page and current activity 200 changes to the specific web page. Topic program 300 determines that current activity 200 has changed from the initiated application to the web page that is loaded.

Topic program 300 examines current activity 200 to determine if the topic and context information of the activity has been identified and finds that the topic of current activity 200 has not been determined (step 320, "no" branch). For example, topic program 300 examines current activity 200 to determine if the activity topic and context information has been identified. If current activity 200 has just been initiated (or "opened") topic program 300 checks relevance file 205 and finding no information, concludes that topic and context information has not been determined for current activity 200 (step 320, "no" branch).

Topic program 300 analyzes current activity 200 and determines the topic and context information associated with the activity (step 330). For example, current activity 200 is a web page displayed on an active screen of display 520 (FIG. 5), with a cursor and pointer image for selection displayed on the web page active screen. Topic program 300 analyzes the universal resource locator (URL) address, the title of the web page, the subject line if present, section headers, and the content of the web page. Topic program 300 identifies keywords and combinations of keywords from the title, subject line, and section headers and additionally analyzes the contents of the web page, identifying keywords, combinations of words and frequency of words. In addition, topic program 300 may take additional context information into consideration and determine if the link to the web page was included in an email or SMS associated with a particular author, or if the communication is associated with a specific source. Topic program 300 may also include date, day and time of day as part of context consideration of the activity.

In one embodiment, topic program 300 assigns a weighted score to keywords in the title, author, subject and section header components of the web page that may indicate the topic of the web page content. Topic program 300 analyzes the contents of the web page and determines the frequency of matches between the contents and keywords from the title, subject or section headers. Based on the scoring of keywords and the frequency of matches of title, subject line, and section header to the contents, topic program 300 creates probabilities of topics for current activity 200. Topic program 300 selects the highest probability to be the topic of current activity 200 and includes the analysis of other topic probabilities in the topic information and stores the information in relevance file 205. The topic information may be re-analyzed and changed by topic program 300 if current activity 200 of computing device 110 is updated or edited.

If current activity 200 had been previously opened as a first activity, the analysis of the topic and context information may have been determined and stored in relevance file 205. If a user of computing device 110 changed activities so that a second activity became current activity 200, the first activity may remain open, but because it is no longer current activity 200, the topic and context information of the first activity is saved to relevance file 205. If the first activity again becomes current activity 200, then topic program 300 determines that the activity topic and context information has been determined (step 320 "yes" branch).

Topic program 300 retrieves the topic and context information associated with a previous current activity that has again become current activity 200 (step 325). For example, a first activity was previously current activity 200 at which time topic program 300 determined the topic of the first activity associated with the topic and context information. Subsequently, a second activity became current activity 200 and the topic and context information associated with the first topic was stored in relevance file 205. After a period of time, the first activity again becomes current activity 200 and topic program 300 retrieves the topic and context information from relevance file 205.

When computing device 110 changes current activity, topic program 300 determines the topic and context of the activity, either by retrieving previously determined information or by initially determining the current activity topic and context as described above in steps 325 and 330, respectively. Topic program 300 then checks for stored communications that were not relevant to a previous activity, but may be relevant to the current activity (step 335).

For example, computing device 110 changes the current activity from a previous activity to current activity 200. Topic program 300 determines the topic and context information of current activity 200, which is either retrieved from relevance file 205 if current activity 200 was a previous current activity and not closed, or determined initially by analysis as described above in step 330. Topic program 300 checks the stored communications that were received and were not relevant to the previous current activities. The stored communications that were not relevant to a previous current activity are considered received communications for a new current activity, such as current activity 200, and the stored communication relevance level will be re-assessed and replaced, as a result of the change in current activity.

Having determined the topic information for current activity 200, topic program 300 determines that a communication, for example communication 210, has been received by computing device 110 (step 340 "yes" branch) and proceeds to determine the topic and context information of communication 210 (step 350). Similar to the activity topic determination discussion above, topic program 300 analyzes the author (source), title, subject and contents of communication 210 and determines the highest probability of topic for the communication. The topic and context information of current activity 200 and communication 210 are passed to relevant notification program 400.

For example, topic program 300 analyzes communication 210 determining keywords from the title, subject line, section headers and contents of the communication. Topic program 300 also determines the author (or source) and timing of communication 210 to associate a context, if known. Using the topic and context information, topic program 300 determines the highest probability of topic for communication 210, and the topic and context information for both current activity 200 and communication 210 are passed to relevant notification program 400.

If topic program 300 determines that there has been no change of the current activity (step 310, "no" branch), the program continues to monitor for the receipt of communications, and if no communications have been received (step 340, "no" branch), topic program 300 monitors for a change of current activity (step 310).

Figure 4:
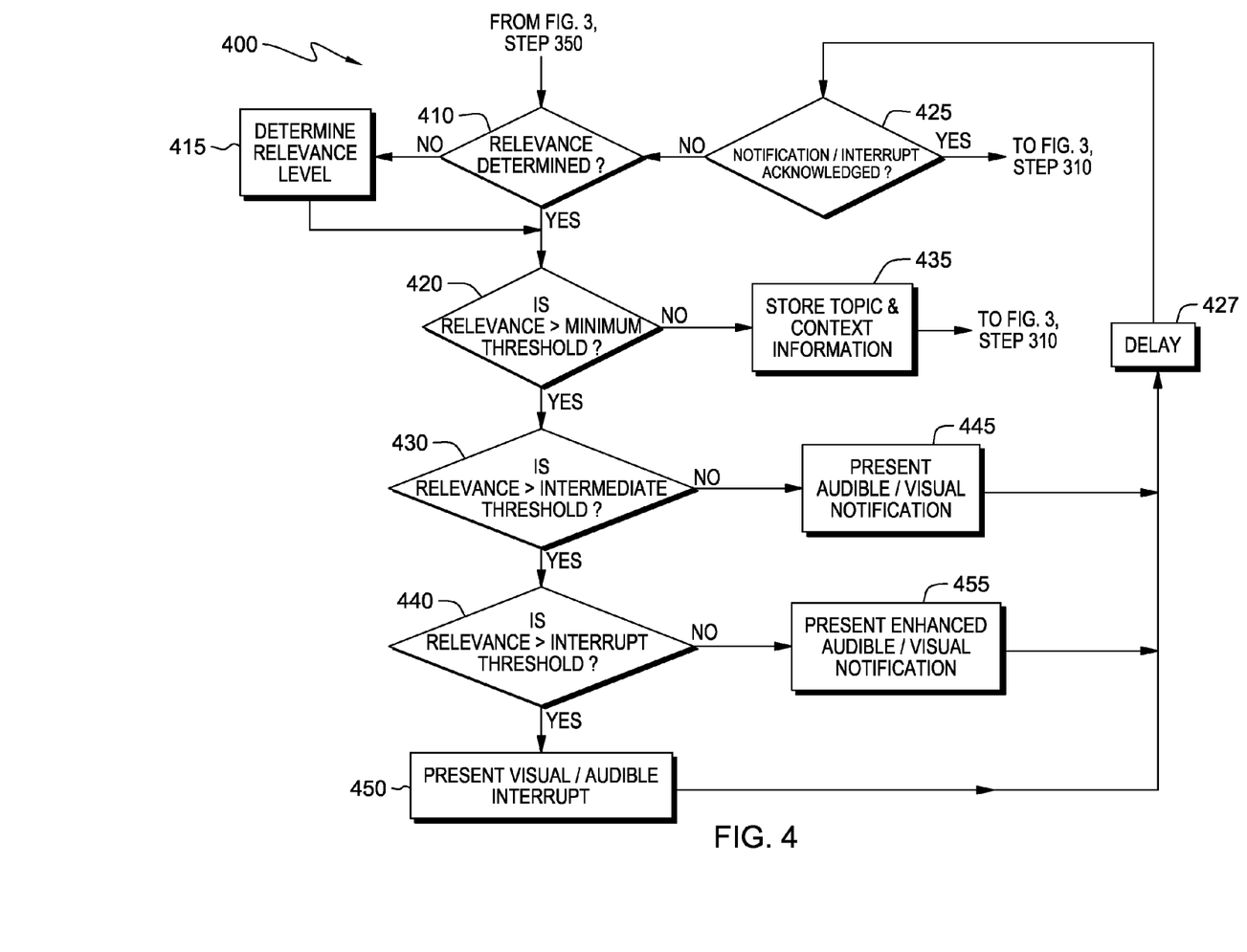
FIG. 4 is a flowchart depicting operational steps of a relevant notification program, running on a computing device within the data processing environment of FIG. 1, in accordance with an embodiment of the present invention.

FIG. 4 is a flowchart depicting operational steps of relevant notification program 400, running on a computing device within the distributed data processing environment of FIG. 1, in accordance with an embodiment of the present invention. Relevant notification program 400 receives topic and context information for the current activity and the received communication, from topic program 300 and checks if a level of relevance has been determined. Having concluded that a level of relevance has not yet been determined for current activity 200 (step 410 "no" branch), relevant notification program 400 proceeds to determine a level of relevance between the communication and current activity (step 415).

Many implementations are possible to establish a measurement of relevance between a received communication and a current activity. In an exemplary embodiment of the present invention, a relevance level may be determined by comparing elements of the topic and context information files compiled by topic program 300 for current activity 200 and communication 210. Relevant notification program 400 compares the keywords from titles, subject lines, and filenames and generates a "matching percentage", which may be a simple quotient of the number of keywords of communication 210 and current activity 200 or may result from other calculations comparing the content of communication 210 and current activity 200.

Relevant notification program 400 may also compare key-phrases that include a verb associated with a keyword noun and modifiers. Matches of key-phrases may be more heavily weighted and may increase the "matching percentage", for example by a factor of 1.5 times or 2.0 times. Relevant notification program 400 may also compare the number of occurrences of keywords and key-phrases within the content of communication 210 and current activity 200. The comparison may include the number of different keywords that have matches or the repeat occurrences of a keyword that have matches, or both. The "matching percentage" may increase significantly in instances with matches of multiple keywords or key-phrases, or for instances in which both current activity 200 and communication 210 include repetition of matching keywords or key-phrases. In such cases the "matching percentage" may increase, for example, an additional 10%, for each instance of multiple keywords that match, or repetition of matching keywords. In another embodiment the matching percentage may be a quotient of the total instances of keywords and key-phrases of communication 210 and current activity 200.

Having determined a level of relevance, (step 410, "yes" branch), relevant notification program 400 determines if the level exceeds a minimum threshold that is predefined and stored in a user profile. If the level of relevance fails to exceed the minimum threshold (step 420 "no" branch) then relevant notification program 400 stores the communication as unread or unacknowledged, and may store the topic and context information of the communication as well. Relevant notification program 400 suppresses the notification alert, preventing interruption (step 435), and relevant notification program 400 returns to step 310 of topic program 300.

For example, the relevance level of communication 210 to current activity 200 is determined to be 30% and the minimum threshold has been set at 50%. Because the relevance level is below the predefined threshold of 50%, relevant notification program 400 does not present any audible or visual notification to a user of computing device 110, and instead stores communication 210 and may store the topic and context information for communication 210. Communication 210 may have a higher relevance if there is a change of current activity, therefore communication 210 is stored as unread or un-acknowledged and relevant notification program 400 returns to step 310 of topic program 300.

If the relevance level is determined to exceed the predefined minimum threshold, (step 420, "yes" branch), relevant notification program 400 determines if the level of relevance exceeds one or more intermediate thresholds. If the level of relevance does not exceed one or more intermediate thresholds (step 430, "no" branch), an audible notification indicating a lower relevance level, which is above the minimum threshold but below an intermediate threshold, is presented to establish awareness that a communication has been received that has relevance to the current activity (step 445). Various embodiments of the present invention may include only a minimum threshold of relevance level or may include combinations of minimum, intermediate, and interruption thresholds of relevance level.

For example, if the level of relevance of communication 210 to current activity 200 is determined to be 60%, relevant notification program 400 will present a low-level audible notification to a user of computing device 110, because the level of relevance exceeds the minimum threshold of 50%, but does not exceed an intermediate threshold of 70%.

If the level of relevance is greater than one or more intermediate thresholds (step 430, "yes" branch) relevant notification program 400 determines if the level of relevance exceeds a predefined interrupt threshold. If the level of relevance does not exceed the interrupt threshold (step 440, "no" branch), relevant notification program 400 presents an enhanced audible notification (step 455). If more than one intermediate threshold is predefined, the enhancement of the notification corresponds to the threshold exceeded by the level of relevance; exceeding a higher level threshold produces a notification with greater enhancement.

If the level of relevance exceeds intermediate thresholds, relevant notification program 400 determines if the level of relevance exceeds an interrupt threshold. If the relevance level does exceed the interrupt threshold (step 440, "yes" branch), relevant notification program 400 presents an interrupt notification on the screen of current activity 200 that includes a visual notification, positioned and with attributes making the notification clearly noticeable; essentially interrupting the user engaged in current activity 200 on computing device 110 (step 450). The interrupt notification may also include an enhanced audible notification.

For example, if the relevance level of communication 210 is determined by relevant notification program 400 to be 85%, and the predefined interrupt threshold was set at 80%, then the interrupt threshold is exceeded and a visual notification is presented on the active screen of current activity 200. In one embodiment, the notification may be accompanied with an enhanced audible notification. In other embodiments, the visual notification may include a color scheme to improve obtaining the attention of a user, and may combine with other visual notification techniques, such as flashing and placement of the visual notification at or near the cursor position. In yet other embodiments, the notification may require acknowledgement of the notification for a user to continue current activity 200.

After the appropriate notification action has been delivered, relevant notification program 400 determines if the communication for which the notification was presented has been ignored or acknowledged, by saving or deleting the communication. Having determined that the communication has been acknowledged (step 425, "yes" branch), relevant notification program 400 returns control to topic program 300, step 310, where current activity and received communications will be monitored. In one embodiment, a predefined delay (step 427), may be included from the time the notification is presented to the time relevant notification program 400 checks to determine if the notification has been acknowledged (step 425). The delay accounts for the time a user of computing device 110 may take to complete a task associated with current activity 200 before acknowledging the notification.

For example, after presenting a notification (e.g., a visual interruption notification in step 450, an enhanced audible notification in step 455 or an audible notification in step 445), relevant notification program 400 determines if a user of computing device 110 has acknowledged communication 210. Confirming that communication 210 has been viewed, relevant notification program 400 ends and returns control to topic program 300 (step 210), to monitor current activity and receipt of communications.

If the communication for which the notification was presented, is not acknowledged (step 425, "no" branch), relevant notification program 400 determines if a relevance level exists between the current activity and the unacknowledged communication (step 410) and proceeds as described above with regard to FIG. 4 flowchart. In one embodiment, the level of relevance may be re-determined (step 410, "no" branch), if current activity 200 has been updated, edited, or changed.

FIG. 5 depicts a block diagram of components of computing device 110 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

In one embodiment, topic program 300 and relevant notification program 400 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information. In yet other embodiments, topic program 300 and relevant notification program 400 are stored on persistent storage 508 remotely accessed by computing device 110 via connection to network 150.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of distributed data processing environment 100 and computing device 110. In these examples, communications unit 510 includes one or more network interface cards. Communications unit 510 may provide communications through the use of either or both physical and wireless communications links. Topic program 300 and relevant notification program 400 may be downloaded to persistent storage 508 through communications unit 510.

I/O interface(s) 512 allows for input and output of data with other devices that may be connected to computing device 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., topic program 300 and relevant notification program 400, can be stored on such portable computer-readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for providing a notification to a user, the method comprising:
   determining a topic and context information of content included in an active window of one or more open windows displayed by a computing device based on an analysis of the content included in the active window;
   selecting a first topic and context information of the content included in the active window from a plurality of possible topics and context information of content included in the active window, based on a probability determined for each of the plurality of possible topics and context information of content included in the active window, wherein the first topic and context information has a highest probability of probabilities for the plurality of possible topics and context information of the content included in the active window;
   receiving a communication;
   determining a topic and context information of the communication based on an analysis of content included in the communication that is received;
   selecting a second topic and context information of the content included in the communication that is received, from a plurality of possible topics and context information of the communication that is received, based on a probability determined for each of the plurality of possible topics and context information of the content included in the communication that is received, wherein the second topic and context information has a highest probability of probabilities for the plurality of possible topics and context information of the content included in the communication that is received;
   determining the second topic and context information as the topic and context information of the content included in the communication that is received, and the first topic and context information as the topic and context information of the content included in the active window;
   determining a level of relevance between the topic and the context information of the content included in the communication that is received, and the topic and the context information of the content included in the active window, based on a comparison of the topic and the context information of the content included in the active window and the topic and the context information of the content included in the communication that is received;
   determining whether the level of relevance exceeds a predefined threshold; and
   in response to determining that the level of relevance exceeds the predefined threshold, providing a notification to the user, wherein a greater level of relevance of the topic and the context information of the content included in the active window to the topic and the context information of the content included in the communication that is received, results in a greater severity level of the notification.

2. The method of claim 1, wherein the severity level of the notification includes one or a combination of an audible notification and a visual notification, wherein the one or the combination of the audible notification and visual notification increases in intensity or changes pattern, as the level of relevance increases, wherein the changes in pattern of the audible notification include one or a combination of: duration, repetition, pitch frequency, and type of audible sound, and wherein the changes in pattern of the visual notification includes one or a combination of: brightness, color change, flashing, movement, shape, size, and positioning near a cursor position.

3. The method of claim 1, wherein the predefined threshold includes a plurality of predefined thresholds, each predefined threshold having a different level of relevance between the topic and the context information of the content included in the active window and the topic and the context information of the content included in the communication, and each predefined threshold having a corresponding severity of notification in which a greater predefined level of relevance threshold generates a higher severity level notification.

4. The method of claim 1, wherein a previously determined level of relevance of an unread communication is replaced with a newly determined level of relevance of the unread communication, upon a change of the active window.

5. The method of claim 1, further comprising:
   in response to determining the level of relevance fails to exceed the predefined threshold, suppressing the notification, such that the notification is not displayed to the user.

6. The method of claim 1, wherein the communication that is received and the topic and context information of the content included in the communication that is received, are stored in response to determining that the level of relevance fails to meet the predefined threshold.

7. The method of claim 1, wherein a new active window is interrupted by displaying a second notification, in response to determining a level of relevance of a topic and context information of content included in a received communication that has been stored, exceeds the threshold level of relevance, as compared to a topic and context information of content included in the new active window.

8. A computer program product for providing a notification to a user, the computer program product comprising:
   one or more computer-readable storage media and program instructions stored on the one or more computer-readable storage media, wherein the one or more computer-readable storage media are not transitory signals per se, the program instructions comprising:
   program instructions to determine a topic and context information of content included in an active window of one or more open windows displayed by a computing device based on an analysis of the content included in the active window;
   program instructions to select a first topic and context information of the content included in the active window from a plurality of possible topics and context information of content included in the active window, based on a probability determined for each of the plurality of possible topics and context information of content included in the active window, wherein the first topic and context information has a highest probability of probabilities for the plurality of possible topics and context information of the content included in the active window;
   program instructions to receive a communication;
   program instructions to determine a topic and context information of the communication based on an analysis of content included in the communication that is received;
   program instructions to select a second topic and context information of the content included in the communication that is received, from a plurality of possible topics and context information of the communication that is received, based on a probability determined for each of the plurality of possible topics and context information of the content included in the communication that is received, wherein the second topic and context information has a highest probability of probabilities for the plurality of possible topics and context information of the content included in the communication that is received;
   program instructions to determine the second topic and context information as the topic and context information of the content included in the communication that is received, and the first topic and context information as the topic and context information of the content included in the active window;
   program instructions to determine a level of relevance between the topic and the context information of the content included in the communication that is received and the topic and the context information of the content included in the active window, based on a comparison of the topic and the context information of the content included in the active window and the topic and the context information of the content included in the communication that is received;
   program instructions to determine whether the level of relevance exceeds a predefined threshold; and
   in response to determining that the level of relevance exceeds the predefined threshold, program instructions to provide a notification to the user, wherein a greater level of relevance of the topic and the context information of the content included in the active window to the topic and the context information of the content included in the communication that is received, results in a greater severity level of the notification.

9. The computer program product of claim 8, further comprising:
   program instructions for the severity level of the notification to include one or a combination of an audible notification and a visual notification, wherein the one or the combination of the audio notification and visual notification increases in intensity or changes pattern, as the level of relevance increases, wherein the changes in pattern of the audio notification includes one or a combination of: volume, duration, repetition, pitch frequency, and type of audible sound, and the changes in pattern of the visual notification includes one or a combination of: brightness, color change, flashing, movement, shape, size, and positioning near a cursor position.

10. The computer program product of claim 8, wherein the predefined threshold includes a plurality of predefined thresholds, each predefined threshold having a different level of relevance between the topic and the context information of the content included in the active window and the topic and the context information of the content included in the communication, and each predefined threshold having a corresponding severity of notification in which a greater predefined level of relevance threshold generates a higher severity level notification.

11. The computer program product of claim 8, wherein a previously determined level of relevance of an unread communication, is replaced with a newly determined level of relevance of the unread communication, upon a change of the active window.

12. The computer program product of claim 8, further comprising:
   in response to determining the level of relevance fails to exceed the predefined threshold, program instruction to suppress the notification, such that the notification is not displayed to the user.

13. The computer program product of claim 8, wherein the communication that is received, and the topic and context information of the content included in the communication that is received, are stored in response to determining that the level of relevance fails to meet the predefined threshold.

14. The computer program product of claim 8, wherein a new active window is interrupted by displaying a second notification, in response to determining a level of relevance of a topic and context information of content included in a received communication that has been stored, exceeds the threshold level of relevance, as compared to a topic and context information of content included in the new active window.

15. A computer system for providing a notification to a user, the computer system comprising:
one or more computer processors;
one or more computer-readable storage media, wherein the one or more computer-readable storage media are not transitory signals per se;
program instructions stored on the computer-readable storage media for execution by at least one of the one or more computer processors, the program instructions comprising:
program instructions to determine a topic and context information of content included in an active window of one or more open windows displayed by a computing device based on an analysis of the content included in the active window;
program instructions to select a first topic and context information of the content included in the active window from a plurality of possible topics and context information of content included in the active window, based on a probability determined for each of the plurality of possible topics and context information of content included in the active window, wherein the first topic and context information has a highest probability of probabilities for the plurality of possible topics and context information of the content included in the active window;
program instructions to receive a communication;
program instructions to determine a topic and context information of the communication based on an analysis of content included in the communication that is received;
program instructions to select a second topic and context information of the content included in the communication that is received, from a plurality of possible topics and context information of the communication that is received, based on a probability determined for each of the plurality of possible topics and context information of the content included in the communication that is received, wherein the second topic and context information has a highest probability of probabilities for the plurality of possible topics and context information of the content included in the communication that is received;
program instructions to determine the second topic and context information as the topic and context information of the content included in the communication that is received, and the first topic and context information as the topic and context information of the content included in the active window;
program instructions to determine a level of relevance between the topic and the context information of the content included in the communication that is received, and the topic and the context information of the content included in the active window, based on a comparison of the topic and the context information of the content included in the active window and the topic and the context information of the content included in the communication that is received;
program instructions to determine whether the level of relevance exceeds a predefined threshold; and
in response to determining that the level of relevance exceeds the predefined threshold, program instructions to provide a notification to the user, wherein a greater level of relevance of the topic and the context information of the content included in the active window to the topic and the context information of the content included in the communication that is received, results in a greater severity level of the notification.

16. The system of claim 15, further comprising:
program instructions for the severity level of the notification to include one or a combination of an audible notification and a visual notification, wherein the one or the combination of the audible notification and visual notification increases in intensity or changes pattern, as the level of relevance increases, wherein the changes in pattern of the audible notification include one or a combination of: volume, duration, repetition, pitch frequency, and type of audible sound, and wherein the changes in pattern of the visual notification includes one or a combination of: brightness, color change, flashing, movement, shape, size, and positioning near a cursor position.

17. The system of claim 15, wherein the predefined threshold includes a plurality of predefined thresholds, each predefined threshold having a different level of relevance between the topic and context information of the content included in the active window and the topic and context information of the content included in the communication, and each predefined threshold having a corresponding severity of notification in which a greater predefined level of relevance threshold generates a higher severity level notification.

18. The system of claim 15, wherein a previously determined level of relevance of an unread communication is replaced with a newly determined level of relevance of the unread communication, upon a change of the active window.

19. The system of claim 15, further comprising:
in response to determining the level of relevance fails to exceed the predefined threshold, program instruction to suppress the notification, such that the notification is not displayed to the user.

20. The system of claim 15, wherein a new active window is interrupted by displaying a second notification, in response to determining a level of relevance of a topic and context information of content included in a received communication that has been stored, exceeds the threshold level of relevance, as compared to a topic and context information of content included in the new active window.

* * * * *